United States Patent [19]

Shirley

[11] Patent Number: 4,630,511
[45] Date of Patent: Dec. 23, 1986

[54] LUG WRENCH SUPPORT TOOL

[76] Inventor: Chester L. Shirley, Rt. 1, Box 49-D, Elgin, Oreg. 97827

[21] Appl. No.: 831,053

[22] Filed: Feb. 28, 1986

Related U.S. Application Data

[63] Continuation of Ser. No. 632,862, Jul. 20, 1984, abandoned.

[51] Int. Cl.⁴ .............................................. B25B 23/00
[52] U.S. Cl. ..................................................... 81/462
[58] Field of Search ................. 81/52, 180.1, 462, 54; 248/231.2, 57

[56] References Cited

U.S. PATENT DOCUMENTS

| | | | |
|---|---|---|---|
| 2,761,340 | 9/1956 | Harrington | 81/54 |
| 3,097,550 | 7/1963 | Johnston | 81/462 |
| 3,262,341 | 7/1966 | Cline et al. | 81/462 |
| 3,577,818 | 5/1971 | Cramer | 81/462 |

Primary Examiner—Frederick R. Schmidt
Assistant Examiner—Debra S. Meislin
Attorney, Agent, or Firm—Robert L. Harrington

[57] ABSTRACT

A tool for supporting a lug wrench when removing lug nuts from the outer wheel of a dual wheel truck mounting. The tool includes a containment ring that holds and supports a lug wrench, and support legs that fit inside the wheel well and rigidly support the containment ring in line with the lug nuts. A locking mechanism extends and retracts one of the legs for locking and unlocking the tool inside the wheel well.

4 Claims, 5 Drawing Figures

LUG WRENCH SUPPORT TOOL

This application is a continuation of application Ser. No. 632,862, filed 7-20-84, now abandoned.

FIELD OF INVENTION

This invention relates to a tool for supporting a manually operated lug wrench used to tighten and loosen lug nuts on a vehicle wheel.

BACKGROUND OF INVENTION

This invention has particular application to wheels having a deep center well, requiring the lug wrench to have a substantial length between the end that engages the lug nut at the bottom of the well, and the torquing lever located outside the well. Such wheels are a common occurance in dual wheel mountings such as used on large tractor-trailer rigs. The outside wheel in such a dual wheel mounting arrangement typically has a deep well so as to enable the wheel to be mounted to the hub of the inside wheel.

When it is necessary to remove the outside wheel e.g. when the tire of the outside wheel has gone flat, the driver of the rig is faced with the problem of either changing the tire himself with the manual lug wrench, or calling for help. Contrary to what might be believed, the latter choice is often made because of the difficulty in removing the lug nuts of these outside wheels. Typically, the lever for the lug wrench has to be applied to the shaft of the wrench at a distance of some 12 to 15 inches from the nut engaging end of the wrench. With the only support for the wrench being the nut at one end and the driver's hands at the other, coupled with the need to apply considerable torquing force to loosen the nut, it is difficult and often impossible to keep the wrench from slipping off the nut. Many drivers have received injuries while attempting to accomplish the task of loosening the nut under these conditions, and thus experience dictates that the wiser course is to simply call for help.

The idea of providing a support for the shaft of the wrench was apparently considered prior to the present invention, although no direct knowledge of such a tool is known to the inventor. Presumably an up-right support member was itself supported in a base member designed to rest on the ground along side of the wheel. Notches in the up-right member were designed to provide vertical support for the shaft of the wrench at various elevations from the ground. However, such a support tool was apparently found unsatisfactory in that support was provided only in the vertical direction. When torquing the lever of the wrench, the wrench is jerked from side to side and up and down and such a ground supported tool member is incapable of providing adequate support.

BRIEF DESCRIPTION OF INVENTION

The present invention provides a support tool that is designed to fit inside the well of the wheel. It is supported in the wheel well in a manner whereby all movements radially directed from the shaft of the wrench are restricted. In general, the support tool includes a support ring that fits around the shaft of the wrench and a plurality of radially extended legs that extend to the peripheral wall of the wheel well. A locking mechanism forces extension of the legs to lock the tool to the wheel, with the support ring spaced from the wall of the well in alignment with a lug nut. The legs of the tool are simply loosened and rotated within the well to align the ring with successive lug nuts. In the preferred embodiment, the tool is collapsable for convenient storage in the tool box of the rig until needed.

DETAILED DESCRIPTION AND DRAWINGS

A better understanding of the invention and the preferred embodiment thereof will be realized by reference to the following detailed description and drawings wherein.

Figure 2:
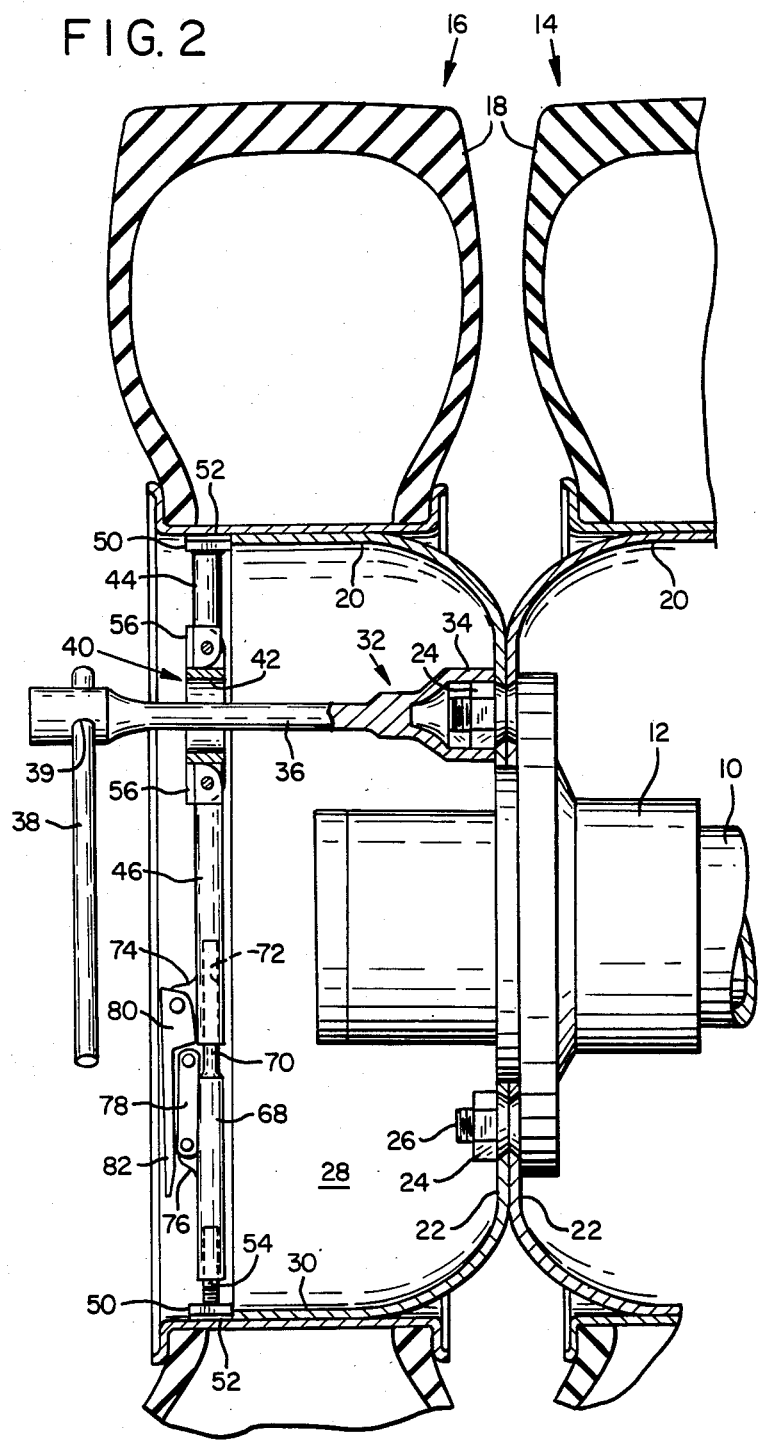
FIG. 2 is a sectional view as taken on view lines 2—2 of FIG. 1 illustrating a lug wrench in position to remove a lug nut from the wheel.

Referring to FIG. 2 of the drawings, a typical truck dual wheel mounting includes a truck axle 10 carrying a mounting bracket 12. The bracket 12 is designed to carry an inside wheel 14 and an outside wheel 16, each of which includes a tire 18 and wheel hub 20. The wheel hubs 20 each include a mounting plate 22 for mounting the hub to the bracket 12, and in the case of the inner wheel 14, the mounting plate is located at the outer side of the wheel, and in the case of the outer wheel 16, the mounting plate 22 is located at the inside of the wheel. The two mounting plates 22 can thus be abutted against each other and lug nuts 24 are screwed onto bolts 26 projecting from the bracket 12. In actuality, the inner wheel 14 is fastened by a lug nut to the bracket 12 independent of the outer wheel, the outer wheel lug nut 24 being screwed onto the lug nut of the inner wheel. For purposes of this invention, it is only necessary to understand that the lug nut 24 that fastens the outer wheel 18 to the bracket 12, is screwed tightly up against the mounting plate 22 of the wheel 16, and because the mounting plate is located on the inside of the wheel 16, lug nuts 24 are seated deeply within the wheel center, hereafter referred to as the wheel well 28.

Figure 1:
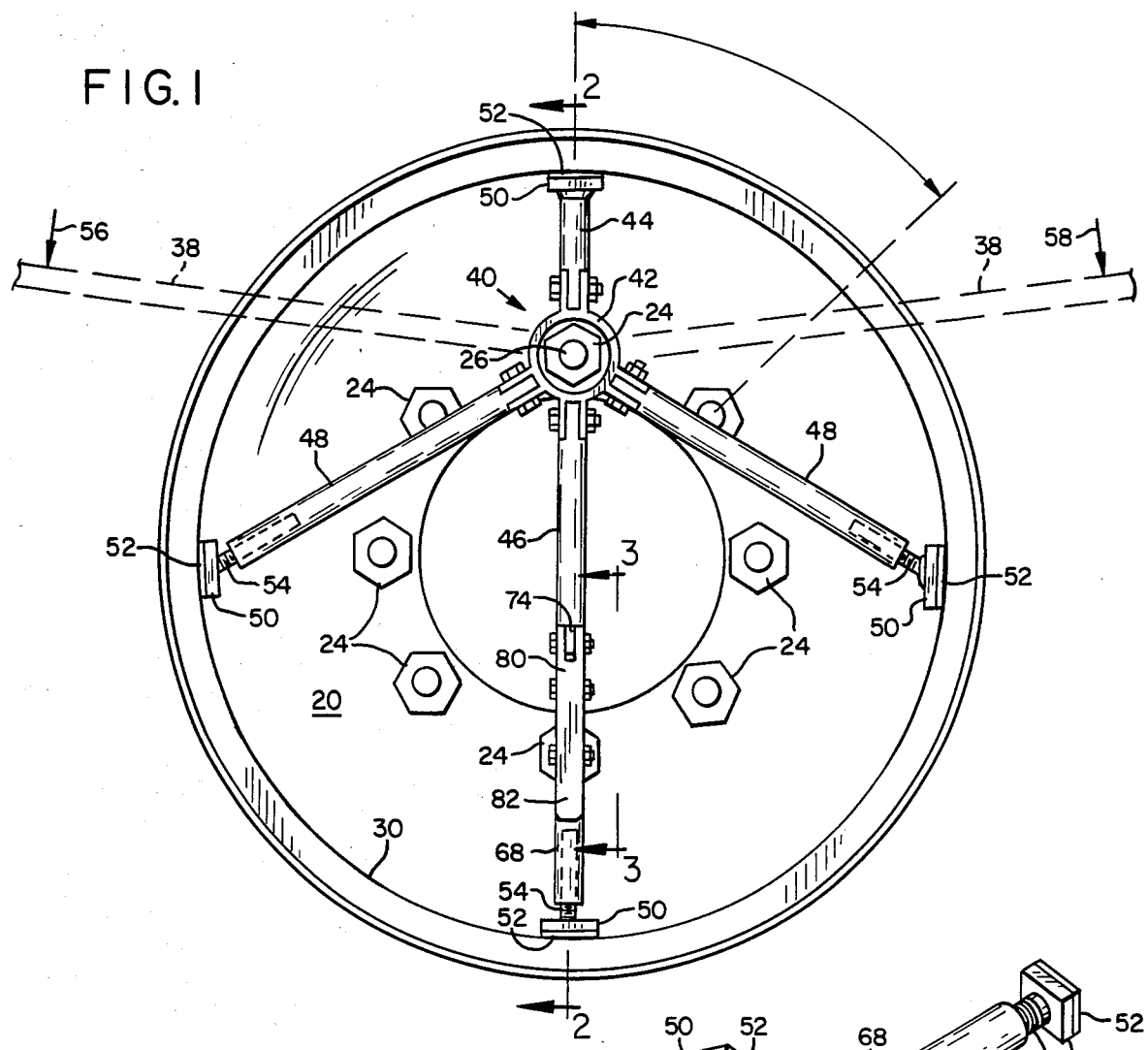
FIG. 1 is a side view illustrating a support tool of the invention mounted in the well of a truck wheel.

Referring now also to FIG. 1 of the drawings, it will be apparent that the wheel lugs 24 are all similarly spaced inwardly of the perripheral wall 30 of the wheel well 28. In order to remove these lugs 24, a lug wrench 32 is used which includes a wrench end 34, a long shaft 36 (i.e. sufficiently long to project out of the well) and a wrench lever 38 that generally comprises a rod that slips through a hole 39 in the end of the shaft 36 projected out of the wheel well. It will be understood that the laterally projected elongated lever 38 is deemed necessary in order for a person (the truck driver) to exert sufficient manual turning force to turn the wrench and loosen the lug. Even with a long lever, the force required often necessitates application of the drivers full weight to the lever in order loosen the lug. It follows that the lever has to connect to the shaft outside of the wheel well in order to get sufficient clearance for the lever. The distance between the wrench end 34 and the lever 36 is typically 12 to 15 inches and the erratic manual force applied to the lever 38 in attempting to loosen the lug nut 24, frequently dislodges the wrench end 34 from the lug nut with disastrous results i.e. skinned knuckles, shins and toes. The reason that the wrench is dislodged is that the force applied to turning of the shaft 36 is consequently applied to the bending of the shaft generally downwardly and sidewardly in reaction to the resistance of the lug nut to loosen. Whereas the lug wrench can not be exactly mated to the size of the lug nut, the bending forces cause the wrench end to slip off the lug nut. It is the containment of these bending forces, to avoid such slipping of the wrench, to which the tool of the present invention is directed. A preferred embodiment of the invention will now be explained.

Again referring to FIGS. 1 and 2, the support tool 40 includes a containment ring 42, the inner diameter of which is sufficiently large to enable easy entry of the wrench shaft 36. Although there are several alternative methods available to obtain coupling of the containment ring and wrench shaft, in the embodiment illustrated, the containment ring is sufficiently large to permit passage of the small end of the wrench i.e. that end which is engaged by the lever 38. The lever, being a rod that is inserted through the hole 39 in the wrench end, is simply removed and the wrench end inserted through the containment ring 42. The rod is then reinserted through the hole 39 in the wrench end.

Four legs are projected from the containment ring 42. A spacer leg 44 is provided to establish the distance of the containment ring from the peripheral wall 30 to place the opening of the containment ring (through which the wrench shaft passes) at the same distance from the peripheral wall as is the lug nut 24. A locking leg 46 projects from the containment ring in line with and oppositely directed from the spacer leg 44 so that the legs 44 and 46 engage the peripheral wall 30 directly accross from each other. (The locking leg incorporates the locking mechanism which will be explained hereafter.) A pair of stablizing legs 48 project laterally from the containment ring at angles that position the ends of the stablizing legs at about the mid points on the peripheral wall 30 between the spacer leg 44 and locking leg 46. The legs 44, 46, and 48 thus engage the wall 30 at 90° angular increments.

Each of the legs 44, 46, and 48 are provided with end pads 50 preferrably having a gripping surface 52 that frictionally grips the peripheral wall 30 of the wheel well. These pads 50 provided on legs 46 and 48 are mounted on the ends of threaded rods 54 that are screwed into the threaded ends of the legs 46 and 48. The pads 52 are appropriately angled with respect to the rods 54 (particularly for the stablizer legs 48) so that the pads engaged the peripheral wall flush against the wall.

Figure 5:
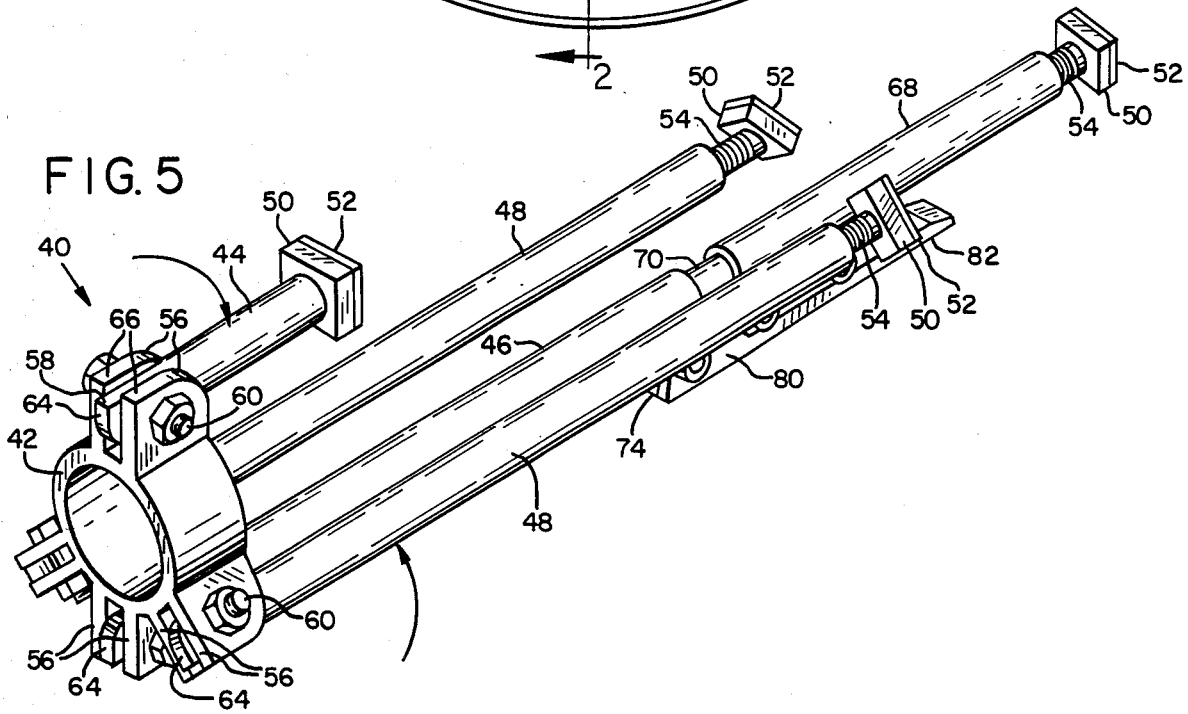
FIG. 5 is a view of the support tool of FIG. 1 showing the device in a collapsed or folded position ready for storage.

Reference is now made to FIG. 5 in addition to FIGS. 1 and 2. Each of the legs 44, 46 and 48 is connected to the containment ring 42 by a hinge connection that includes ears 56 projected from the containment ring that overlap a flange portion 58 projected from the leg. A bolt 60 inserted through mated openings in the ears and flange portion and, fastened by nut 62, functions as a pivoting pin for pivoting of the legs relative to the containment ring. A shoulder 64 provided on the flange portion 58 abutts the outside wall of the ring when in the open position and thus functions as a stop to limit pivoting of the legs between a full extended position as shown in FIGS. 1 and 2 and a one way folded position as illustrated in FIG. 5. A landing 66 on the ears 56 also assist in limiting the pivoting of the legs.

Reference is now made to FIGS. 1, 2, 3, and 4 for an understanding of the locking mechanism. Locking of the support tool in the wheel well is accomplished by extending the length of the locking leg 46 so that the overall length of legs 44, 46 and the intermediate containment ring snuggly fits the span across the wheel well opening. Thus the leg 46 is provided with an extendable end segment 68 having a sliding pin portion 70 slidably carried in a socket 72 in the end of the main body segment of the leg 46. Obviously sliding the pin portion 70 deeper in the socket 72 shortens the leg 46, and sliding the pin portion 70 outwardly of the socket, lengthens the leg 46.

Figure 4:
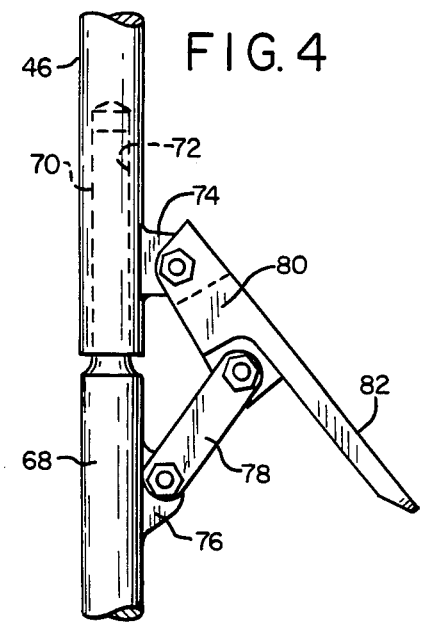
FIG. 4 is a view similar to FIG. 3 but showing the locking mechanism in its open or unlocked position.
Figure 3:
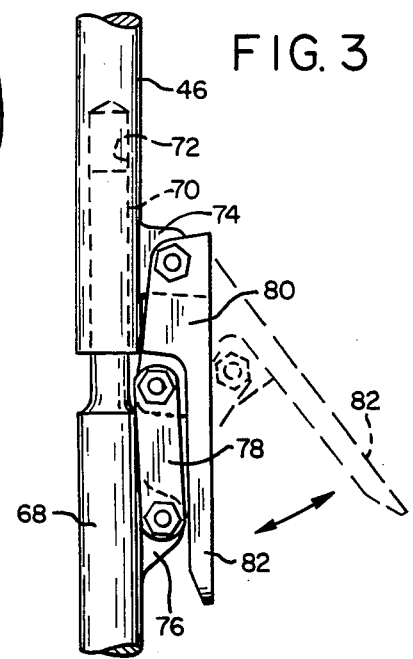
FIG. 3 is a side view of the locking mechanism employed by the support tool of FIGS. 1 and 2 as taken on view lines 3—3 of FIG. 1.

An ear 74 is fastened to the main body segment of legs 46 and ear 76 is fastened to the end segment 68. These ears are interconnected through pivotal link members 78 and 80, the latter having a handle portion 82. Raising the handle 82 as shown in FIG. 4 produces a shortening of legs 46, and forcing the handle against the leg 46 extends the link members to thereby lengthen the leg 46.

OPERATION OF THE DEVICE

It will be understood that the support tool 40 of the invention is designed to fit a specific sized wheel well 30 e.g. 25 to 25½ inches across. However, some variation can be accommodated by screwing the threaded rods of legs 46 and 48 into or out of the leg ends. In any event, with the lug wrench 32 inserted through the containment ring, and with the handle 82 of leg 46 in the raised or shortened position, the tool can be easily positioned into the circular opening of the wheel well. The legs 48 are actually extended to closely match the well diameter, whereas the leg 46 is somewhat shorter as dictated by the length expansion provided by the locking mechanism.

The tool, prior to it being locked against the peripheral wall 30, is rotated as required to line up the containment ring 42 (and thus the lug wrench) with a lug nut 24 e.g. see FIG. 1. The lever 82 of the locking mechanism is then depressed to expand leg 46 tightly against the peripheral wall 30 which thereby locks the tool in place. The wrench 32 is then fitted to the lug nut and turning pressure applied to loosen the nut. The force applied to the lever (see arrow 56 applied to the dashed illustration of the lever 38) urges the shaft 36 of the wrench downwardly and toward the right as viewed in FIG. 1. The shaft will however be restricted to the limited movement permitted by the containment ring and this movement will allow for continued interengagement of the wrench end 34 with the lug nut. (This same restriction applies to a subsequent tightening of the nut as indicated by arrow 58.)

Following removal of the nut 24 (or appropriate loosening thereof) the tool is unlocked by raising the handle 82, the tool is then rotated to align the containment ring with the next lug nut, and the tool is relocked. Upon completion of the tire changing operation, the driver simply folds up the legs as illustrated in FIG. 5, stores the tool in his tool box, and the driver and truck are on their way.

It will be appreciated that numerous modifications and variations are possible to the described embodiment without departing from the inventive concept. For example, the folding feature of the tool is optional. Also, although not considered desirable, a relocation of the stablizing legs to project straight accross from each other (i.e. from the center of the wheel) rather than being projected angularly from the containment ring, is an option. Still further, the adjustment feature of the threaded rod 54 may be avoided and of course other locking designs may be employed. The configuration of the containment ring may be altered to enable coupling of the wrench shaft thereto without having to slide it through from its end e.g. a segment of the ring could be removed and the wrench shaft slipped sidewardly through the opening. Most obviously, the tool is not limited to truck wheels. All of the above and many more variations will be obvious to those skilled in the art and accordingly the invention is not limited to the illustrated embodiment but is encompassed by the claims appended hereto.

What is claimed is:

1. A lug wrench support tool for removing lug nuts located inside a wheel well having a peripheral wall defining a circle with a defined inside diameter, said support tool comprising; a containment ring and four leg members coupled together, said leg members radially extended to terminate at spaced radially directed positions, which positions define a circle equal to the diameter of the circle defined by the wheel well, one of said legs including first and second leg segments axially slideable relative to each other, a toggle mechanism including a pair of pivotally connected links, one of the links connected to one leg segment and the other link connected to the other leg segment, said links being relatively pivotable between a first position for shortening the overall length of the leg segments and a second position for lengthening the overall length of the leg segments and thereby extending said one leg to engage the periphery of said defined circle, said lug wrench containment ring being a fully enclosed circle closely matching the lug wrench to confine the lug wrench radially, said containment ring spaced inwardly of the periphery of the defined circle a distance substantially equal to the distance of the location of the lug nuts inwardly from the peripheral wall of the wheel well.

2. A lug wrench support tool as defined in claim 1 wherein the four leg members are radially projected from the containment ring and terminate at positions around the defined circle at about 90 degree increments, a pair of said legs being a locking leg having the slideable leg segments and an oppositely directed spacer leg spacing the containment ring the desired distance for alignment with the lug nuts, and the remaining pair of legs being stabilizing legs positioned on opposite sides of the containment ring.

3. A lug wrench support tool as defined in claim 2 wherein wall engaging pads are provided on the ends of the spacer, locking, and pair of stabilizing legs for engaging the peripheral wall, and at least one of the stabilizing legs and at least one of the spacer leg and locking leg are provided with pad adjusting means for adjustment of the pads and accordingly the effective length of the legs.

4. A lug wrench support tool as defined in claim 2 including pivotal connection means pivotally connecting the spacer, locking and pair of stabilizing legs to the containment ring, pivotal limiting means provided for the pivotal connection means for limiting the pivotal movement of the legs from a fully extended and operational position whereby the legs are radially directed from the containment ring to a folded ready-for-storage position with the legs axially extended relative to the containment ring with all of the legs being extended in the same axial direction.

* * * * *